United States Patent [19]

Pirooz

[11] Patent Number: 4,522,925

[45] Date of Patent: Jun. 11, 1985

[54] SEALING GLASS AND METHOD OF MAKING A WILLEMITE FILLER THEREFOR

[75] Inventor: Perry P. Pirooz, Toledo, Ohio

[73] Assignee: Owens-Illinois, Inc., Toledo, Ohio

[21] Appl. No.: 528,385

[22] Filed: Sep. 1, 1983

[51] Int. Cl.$^3$ ............................ C03C 3/08; C03C 3/10
[52] U.S. Cl. .......................................... 501/15; 501/17; 501/22; 501/32
[58] Field of Search .................. 501/15, 17, 22, 32

[56] References Cited

U.S. PATENT DOCUMENTS

| | | | |
|---|---|---|---|
| 4,186,023 | 1/1980 | Dumesmil et al. | 501/15 |
| 4,310,357 | 1/1982 | Matsuura et al. | 501/15 |
| 4,365,021 | 12/1982 | Pirooz | 501/32 |

Primary Examiner—Mark L. Bell
Attorney, Agent, or Firm—John R. Nelson

[57] ABSTRACT

A sealing glass composition comprising a lead borate glass matrix and a Willemite filler that provides a blended sealing glass composition with outstanding properties including excellent thermal (button flow and rod seal stress values) and chemical properties. A method of making the Willemite filler is described, the method including critical firing times and temperatures in order to produce the highly effective filler.

1 Claim, No Drawings

SEALING GLASS AND METHOD OF MAKING A WILLEMITE FILLER THEREFOR

The present invention relates to sealing glasses comprising a lead borate glass matrix and a filler comprising Willemite (zinc orthosilicate).

The present invention also relates to a method of making Willemite (zinc orthosilicate).

It is an object of the present invention to provide a sealing glass having superior properties for the hermetic sealing of micro-electronic packages.

It is an object of the present invention to provide a method of making a Willemite (zinc orthosilicate) filler especially adapted for blending with a lead borate glass matrix to provide a sealing glass having an outstanding combination of physical and chemical properties.

These and other objects will be apparent from the specification that follows, and the appended claims.

The present invention provides an improved sealing glass composition comprising a lead borate glass matrix and a Willemite (zinc orthosilicate) filler, the amount of the Willemite being effective to provide a blended sealing glass having excellent hermetic sealing properties and physical-chemical properties including a button flow (486° C.—10¾ min) of at least about 0.8 in. and a rod seal stress of at least about 1800 psi C (compression) in the sealing glass which is sealed to a reference glass having a thermal expansion coefficient of $83 \times 10^{-7}$/°C.

The present invention also provides a method of making a highly effective Willemite filler material adapted to blending with a lead borate glass matrix to produce an improved sealing glass, the method comprising the steps of:

(A) mixing about 67 to 80 parts by weight of ZnO powder and about 20 to 33 parts by weight of $SiO_2$ powder, and a plasticizer with proper amount of water to produce an extrudable mix which is then extruded into small pellets;

(B) firing said pellets of ZnO and $SiO_2$ at a temperature at least about 1300° C. up to about 1400° C. for a time of about 8 to 48 hours to produce fired pellets comprising polycrystalline masses of low expansion Willemite phase of zinc orthosilicate.

In accordance with the present invention, the method of making the finely divided filler material includes the step of milling the Willemite pellets to produce an outstanding filler in which at least about 70% by weight of the filler particles pass through a 400 mesh (U.S.) screen.

The lead borate glass matrix is described in U.S. Pat. No. 4,365,021 to Perry P. Pirroz, entitled "Low Temperature Sealant Glass" and assigned to Owens-Illinois, Inc. This patent is incorporated by reference.

The general and preferred ranges of the ingredients in the lead borate glass are set forth below in approximate weight percents:

| Ingredients | General | Preferred |
|---|---|---|
| PbO | 78-90 | 81.5-85 |
| $B_2O_3$ | 8-16 | 11-13 |
| $Bi_2O_3$ | 2-5 | 2.5-3.5 |
| $SiO_2$ | 0-1 | 0.-0.5 |
| $ZnO_2$ | 0.-2 | 0-1 |
| BaO | 0-1 | 0-1 |
| $Al_2O_3$ | 0-1 | 0-1 |
| $TeO_2$ | 0-4 | 0-3 |
| $As_2O_5$ | 0-2 | 0-1 |

As described in the Perry Pirooz U.S. Pat. No. 4,365,021, the button flow (380° C.—30 min) for the lead borate base glass was about 1.08 in. in Example 1. As set forth in the patent, the button flow test is a standard test in the industry and the art. The rod seal stress test is also a standard test.

EXAMPLE 1

A lead borate glass as a matrix glass was made as is known in the art, and as shown in Example 1 of the previously mentioned U.S. Pat. No. 4,365,021; the glass containing the following ingredients in approximate weight percents:

| Ingredients | Wt. % |
|---|---|
| PbO | 83 |
| $B_2O_3$ | 12.5 |
| $Bi_2O_3$ | 3 |
| ZnO | 0.5 |
| $SiO_2$ | 0.5 |
| BaO | 0.5 |

The glass was fritted and ground to a finely divided material such that at least about 70% by weight of the particles pass through a 400 mesh U.S. Series Sieve screen.

EXAMPLE 2

Powders of ZnO and $SiO_2$ were mixed together using 73 parts by weight of ZnO and 27 parts by weight of $SiO_2$. Water and a plasticizer were added to produce a workable mix. Said mix was then extruded to obtain small pellets of approximately ⅛ inch in diameter.

The extruded pellets of the zinc orthosilicate batch were heated slowly (to effectively burn off the plasticizer at a lower temperature) to 1350° and held for 24 hours which resulted in the formation of Willemite crystalline phase through a solid state reaction.

The resulant Willemite pellets were ball milled to obtain a fine powder in which 80% of the particles are smaller than 38 microns and 100% smaller than 149 microns.

Willemite particles were produced in which about 70% by weight up to 99% by weight passed through a 400 mesh USA standard sieve (38 microns).

The resultant Willemite filler was found to be very thermally stable in the matrix glass, much more stable at higher temperatures than other filler materials such as lead titanate, beta-eucryptite and cordierite.

EXAMPLE 3

The lead borate glass matrix powder of Example 1 and the Willemite filler powder of Example 2 were mixed to provide a blend of 65 parts by weight of lead borate glass and 35 parts by weight of Willemite powder.

The blend was applied to alumina ceramic integrated circuit package parts and heated to 430° C. for 10 minutes to produce a hermetically sealed package. The above sealed packages, including a metal lead frame sandwiched between the ceramic parts, were tested for thermal shock according to Mil Std. 883-1011.2. Said test comprises exposure to two liquids at −65 and +150° C. A total of 100 cycles of said exposure produced no hermeticity failures.

The blend of Example 3 has the following outstanding sealing properties:

| |
|---|
| Button Flow (486° C. - 10¾ min) 0.961 in. |
| Rod Seal Stress (450° C. - 30 min) A-3004 1990 psi C |
| Reference glass with coefficient of thermal expansion 83 × 10⁻⁷ (8.3 ppm) |
| DTA - $T_a$               297° C. |
| DTA - $T_s$               377° C. |

Other excellent physical-chemical properties of the sealing glass made from the blend of Example 3 are as follows:

| Properties | |
|---|---|
| Linear Expansion Coefficient (25-300° C.) | 64.4 × 10⁻⁷/°C. |
| Dielectric Constant (1MH$_z$ 25°) | 11.5 |
| Dissipation Factor (1MH$_z$ 25°) | 0.0022 |
| Volume Resistivety (log-ohm-cm) | |
| 50° C. | 15.85 |
| 150° C. | 11.71 |
| 200° C. | 10.30 |
| 250° C. | 9.16 |
| 300° C. | 8.21 |
| Density (20° C.) | 5.3 mg/cc |
| Chemical Resistance | |
| 50 vol % H$_2$SO$_4$/70° C./120 min | 2.0 mg/cm$^2$ |
| Control sample (typical commercial package sealant glass) | 14.0 mg/cm$^2$ |

The blended sealing glass generally comprises about 30 to 40 parts by weight of Willemite filler per about 60 to 70 parts by weight of vitreous lead borate glass. The sealing glass preferably contains about 32 to 33 up to 37 parts by weight of Willemite and about 63 up to 67 or 68 parts by weight of lead borate glass. For the best results, the sealing glass contains about 35 parts by weight of Willemite and about 65 parts by weight of lead borate glass.

It is preferred that at least about 80% by weight of the blended glass particles pass through a 400 mesh USA Standard Sieve, although satisfactory results are obtained when only 70 to 75% by weight pass through the 400 mesh screen.

The new method of making the highly effective Willemite filler is illustrated in Example 2. Unexpectedly, the firing temperature and time are critical in order to provide a filler that will effectively blend with the lead borate glass to provide an excellent hermetic sealing glass that has outstanding properties including (A) a button flow (486° C.—10¾ min) of at least about 0.8 in. and preferably at least about 0.9 in. and (B) a rod seal stress (450° C.—30 min) of at least about 1800 psi (compression) and preferably about 1900 or 1950 psi (compression).

In the novel method of making the Willemite (zinc orthosilicate) filler powder, it has been found that the firing temperature must be above about 1300° C., say around 1305° to 1310° C., and lower than about 1400° C., say no higher than about 1390° or 1395° C. in order to achieve the outstanding results with the blend such as excellent button flow and rod seal stress values. The preferred firing temperature generally range about 1325° to 1375° C. as set forth in Example 2.

The time of firing is critical and it is necessary that firing time be at least about 8 hours and no more than about 48 hours, the preferred time being about 16 to 30 hours. The optimum time, as illustrated in Example 2, is about 24 hours.

In making the Willemite (zinc orthosilicate), generally about 67 to 80 parts by weight of ZnO are used per 20 to 33 parts by weight of SiO$_2$. Preferably, 70 to 76 parts by weight of ZnO are used per 24 to 30 parts by weight of SiO$_2$. The optimum amounts of ZnO and SiO$_2$ are 73 parts by weight of ZnO and 27 parts by weight of SiO$_2$ as illustrated in Example 2.

When the blended glass composition, such as shown in Example 3, is used to provide a hermetic seal, the sealing glass has the following properties:

| Properties | General | Preferred |
|---|---|---|
| Linear Coefficient of Expansion (25-300° C.) | 55-75 | 62-68 |
| Density (20° C.) g/cc | 5.2-5.4 | 5.30-5.35 |
| Button Flow (486° C. - 10¾ min) in. | 0.8-1.5 | 0.95-1.0 |
| Rod Seal Stress (450° C. - 30 min) psi (compression) | 1800-2500 | 1900-2200 |

What is claimed is:

1. A sealing glass composition consisting essentially of about 65 parts by weight of a lead borate glass matrix and 35 parts by weight of a Willemite (zinc orthosilicate) filler, the Willemite (zinc orthosilicate) being made by mixing about 73 parts by weight of ZnO and about 27 parts by weight of SiO$_2$ and firing the mixture at about 1350° C. for about 24 hours and milling the product to provide finely divided Willemite (zinc orthosilicate) with a particle size comprising about 85% finer than 38 microns, the lead borate glass having the following ingredients in approximate weight percents:

| Ingredients | Wt. % |
|---|---|
| PbO | 83 |
| B$_2$O$_3$ | 12.5 |
| Bi$_2$O$_3$ | 3 |
| SiO$_2$ | 0.5 |
| ZnO | 0.5 |
| BaO | 0.5 |

* * * * *